US006082893A

United States Patent [19]

Kassa

[11] Patent Number: 6,082,893

[45] Date of Patent: Jul. 4, 2000

[54] METHOD AND APPARATUS FOR TESTING EMERGENCY LIGHTING UNITS

[76] Inventor: Lawrence M Kassa, 808 Terrace Pl., Cortlandt Manor, N.Y. 10566

[21] Appl. No.: 08/997,005

[22] Filed: Dec. 23, 1997

[51] Int. Cl.[7] ............................ G01K 1/08; H05B 37/00; F21V 19/04

[52] U.S. Cl. ............................ 374/141; 374/208; 315/86; 362/20

[58] Field of Search ................................ 374/1, 100, 141, 374/208; 315/86; 362/20

[56] References Cited

U.S. PATENT DOCUMENTS 4,071,749 1/1978 Balogh ...................................... 362/20

*Primary Examiner*—Vit Miska

*Attorney, Agent, or Firm*—Nims, Howes, Collison, Hansen & Lackert

[57] ABSTRACT

A testing device for emergency lighting units has a telescopic handle, a bracket at a first end of the handle, a magnet at the end of the bracket and a temperature sensor adjacent to the magnet. The magnet has sufficient strength to engage a surface of the lighting unit adjacent a test switch so as to cause actuation of the test switch. The magnet holds the test switch down for the duration of the test. The temperature sensor provides an indication of the ambient conditions adjacent the lighting unit which has an effect on battery life and which is used to determine the frequency of the testing of the unit.

9 Claims, 2 Drawing Sheets

METHOD AND APPARATUS FOR TESTING EMERGENCY LIGHTING UNITS

TECHNICAL FILED

This invention relates to emergency lighting and more particularly to a method and apparatus for testing remotely located emergency lighting units.

BACKGROUND

Emergency lighting units are used in commercial and residential settings to provide battery powered lighting during power outages. Such units typically comprise a casing containing batteries, one or more lights, a connection to line power and a detector for sensing a loss of power, the unit also including a switch responsive to the detector for activating the lighting system.

These units typically include a user interface to periodically test the lighting unit to assure that the lights have not burnt out, and that the batteries are operational. However, it is common to locate these systems along ceilings and high up on walls to maximize area lighting in the event of an emergency. Thus, to test these on a routine basis typically requires a worker to transport a ladder to each unit, and to climb to the level of the unit to initiate testing. Particularly in an industrial setting, where numerous units are located, this is a time consuming and difficult task.

It is also important to test and replace batteries that are weak. While routine periodic testing may show that a battery is satisfactory at the time of testing, there is no assurance that the battery will perform properly in the interim time between tests. Consequently, there is a need for a method for obtaining information to determine battery strength and life, as well as a device which allows ease in testing of emergency lighting units.

SUMMARY OF THE INVENTION

It is an object of the present invention to provide a device for testing remotely located emergency lighting units without using a ladder.

It is a further object of the present invention to provide a method for determining if batteries should be changed out during routine testing.

It is a further object to provide a method and apparatus for testing remotely located emergency lighting units which minimizes the burden on the person conducting the tests.

These and other objects of the present invention are achieved by a testing device comprising a telescopic handle, a test switch activation magnet disposed on a first end of the handle, a temperature sensor disposed adjacent to the magnet, and means for displaying the ambient temperature to the device operator.

Using the testing device involves extending the handle to a length sufficient to reach an emergency lighting unit, placing the magnet on the unit housing against a test switch, the magnet holding the test switch in an engaged position, maintaining the switch in the engaged condition for a period sufficient to insure that the light will illuminate and that the lighting power does not quickly diminish indicating a weakened battery condition. The temperature adjacent to the unit is determined and if elevated or depressed from normal room temperatures, the location is designated for more frequent testing, or for battery changes at shorter intervals.

Using the invention, testing of many units can be accomplished in a short period of time and environmental conditions determined which affect battery life to identify potential problems in the system between testing periods.

DETAILED DESCRIPTION OF THE INVENTION

Figure 1:
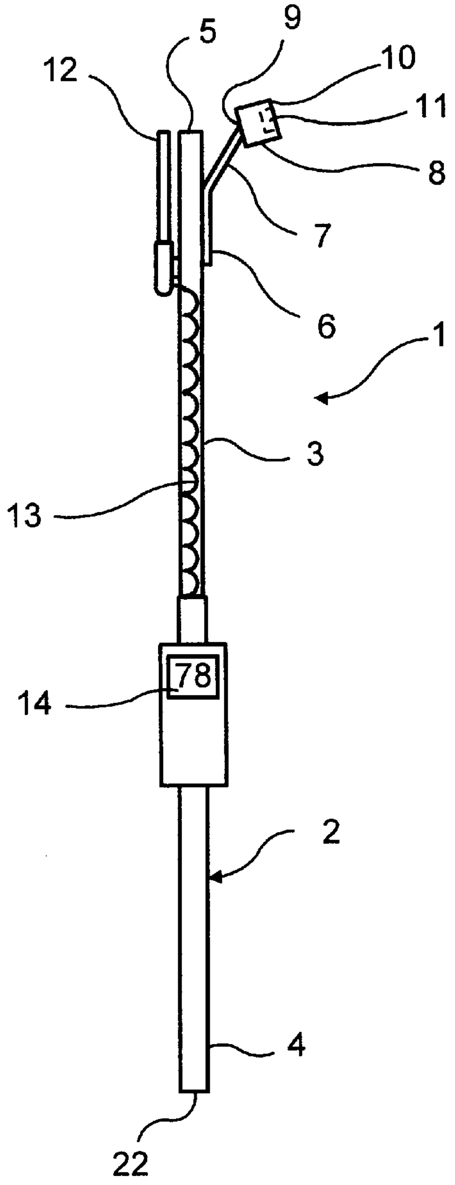
FIG. 1 is a view of the testing device of the present invention.

Referring to FIG. 1, a testing device 1 has a telescopic handle 2 having a first part 3 and a second part 4 movable in relation to each other. Typically, the handle comprises a pair of tubular sections, one section slidingly disposed within the other section. Preferably a telescopic handle which extends from about 4 to about 18 feet is useful for testing lighting in commercial and industrial settings such as in stairwells, warehouses, or operating facilities. Of course, the telescopic handle can comprise more than two sections to increase the compactness of the device when not in use.

The telescopic handle has a test end 5, with a mounting bracket 6 attached thereto. The mounting bracket has a forwardly extending angled portion 7, which supports a magnet 8. The angled portion of the mounting bracket makes it easier to engage the lighting unit without contacting obstructing obstacles. The mounting bracket may be formed integral with the end of the handle or be attached by suitable fasteners.

The bracket supports the magnet 8 at a forward end 9 thereof. The magnet is fairly strong as it must have sufficient strength to overcome the spring force in a test switch used on most lighting units, and to hold the test switch in an on position without operator exertion. These switches may be button or toggle momentary switches, which are only active when held in the on position. This avoids accidental battery discharge by preventing the switch from being left in the on position. The magnet thus frees the operator from the awkward task of trying to hold in the switch, which can easily result in fatigue due to the distance and height of the unit above the worker. Thus, the operator need only position the handle end adjacent the unit, and then allow the magnet to apply the force necessary for depressing the test button.

Figure 2A:
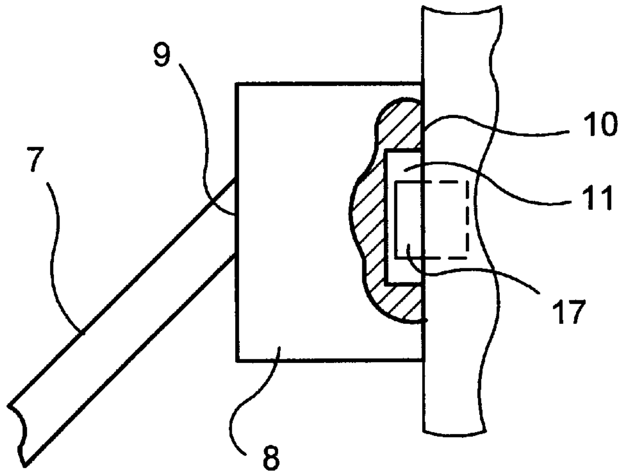
FIG. 2 is a front view of a magnet surface which engages the lighting system unit.

Preferably, the magnet best seen in FIG. 2*a,* has a surface 10 which contains a shallow recess 11 for receiving a test button therein to assure that the button is properly depressed. The magnet surface adjacent to the recess engages the flat surfaces of the lighting unit, with the recess receiving the test button which typically is raised above the adjacent unit surface by about ¼ inch. Thus a corresponding depth recess in the magnet facilitates engagement and maintenance of the magnet against the unit surface.

The testing device also includes a temperature sensor 12 disposed adjacent to the magnet, the sensor connected by a wire 13 to a display 14 provided in proximity to a second end 22 of the handle near to where the operator grips the handle. This is shown as separately attached to the end of the handle, the sensor and wire could be mounted integrally to simplify construction. The display also could be integrally mounted in the handle. The display provides a reading on the ambient temperature conditions around the lighting unit, which could substantially affect the battery life. For example, near a ceiling in a manufacturing plant, the temperature may exceed 120° F., which can shorten battery life. In those locations where excessive heating or cooling are experienced, more frequent testing should be initiated to assure adequate battery power in an emergency.

Figure 3:
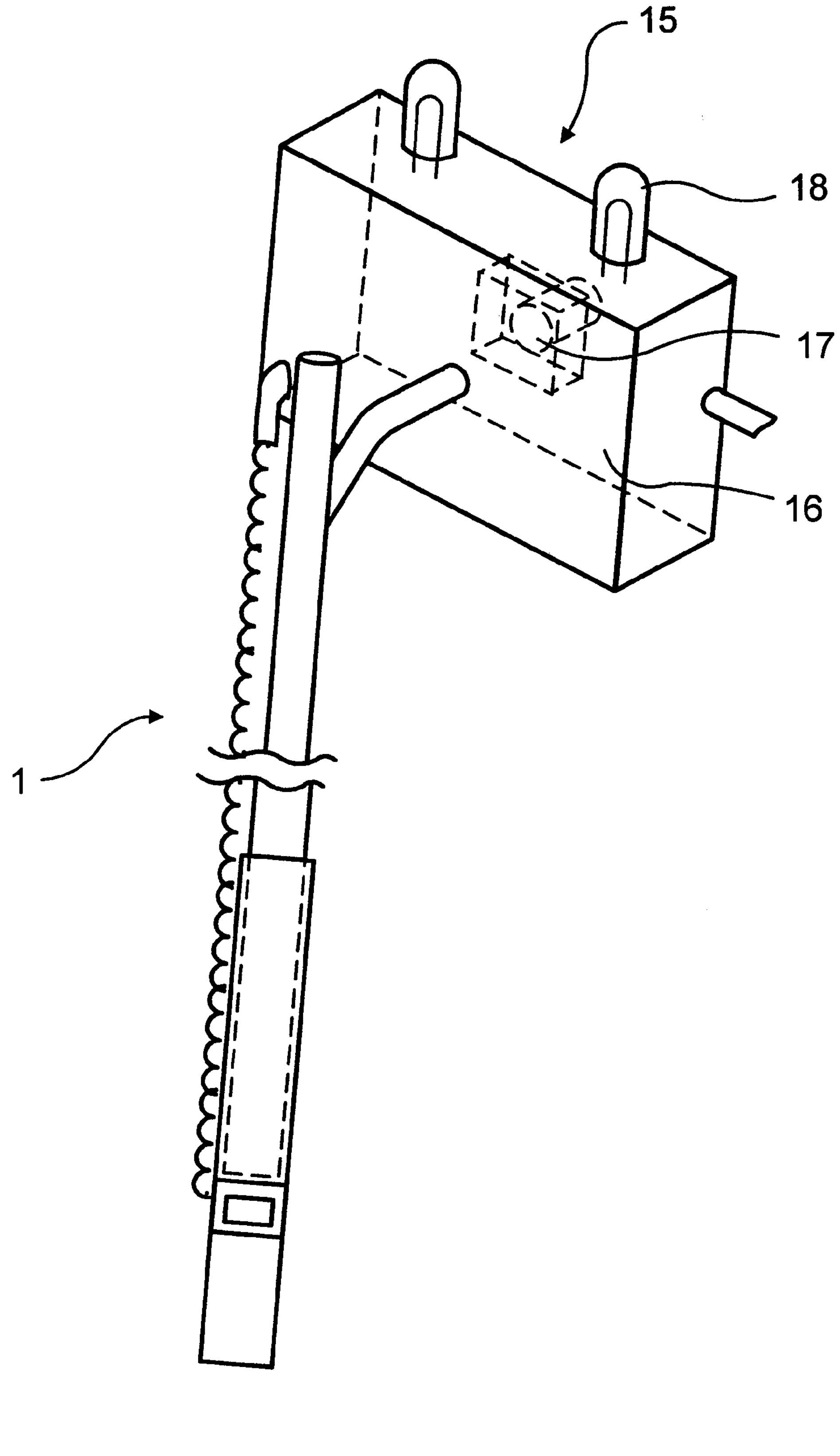
FIG. 3 is a view showing use of the testing device with an emergency lighting unit.

Referring to FIG. 3, the testing device 1 is shown with the handle extended to reach a lighting unit 15. The magnet 8 engages a surface 16 of the unit adjacent to a test button 17, depressing the button and illuminating the lights 18. The button is held in by the magnet so long as the magnet is in contact with the unit, thus easing the operator's burden in performing the testing.

Figure 2B:
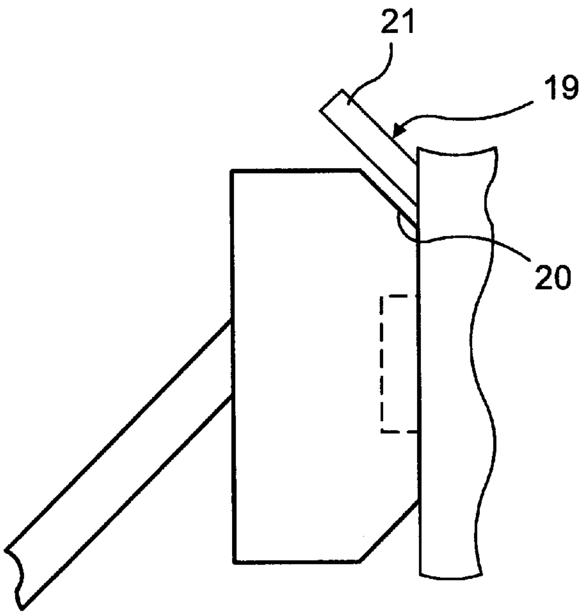

In those units which use a toggle type switch 19 as opposed to a button, the magnet has a groove 20 best seen in FIG. 2*b,* for receiving a lever 21 of the toggle therein. The magnet then holds the toggle switch in the same way as the test button, for a period sufficient to assure that lighting intensity does not diminish quickly.

The handle can be made of any typical material such as wood, metal or plastic.

The magnet is made of a conventional magnetic material, and such magnets are commercially available. The temperature sensor is one commercially available in the art, such as is commonly used with a digital thermometer and preferably has a temperature range of about −20 to about 200° F. The sensor is connected to a display which is preferably a digital LED for ease in taking readings by the operator.

Using the invention, greater assurance of emergency lighting capability can be obtained avoiding potentially hazardous conditions during power outages. Frequent testing can be conducted quickly and with limited operator fatigue increasing the likelihood that complete and thorough testing would be conducted.

While preferred embodiments of the present invention have been shown and described, will be understood by those skilled in the art that various changes or modifications could be made without varying from the scope of the present invention.

I claim:

1. A testing device comprising:

a telescopic handle;

a test switch activating magnet disposed on a first end of the handle;

a temperature sensor disposed adjacent to the magnet; and, means for displaying the temperature in the area adjacent to the magnet.

2. The testing device of claim 1 further comprising:

a mounting bracket disposed on the first end of the handle, the magnet disposed on the mounting bracket.

3. The testing device of claim 1 wherein the magnet has a lighting unit engaging surface having a shallow recess for receiving a test button therein.

4. The testing device of claim 1 wherein the magnet has a lighting unit engaging surface having a groove for receiving a level of a toggle switch therein.

5. The testing device of claim 1, wherein the telescopic handle comprises a pair of telescopic sections, one section slidingly disposed within the other section.

6. The testing device of claim 1 wherein the handle is extendible for from about 4 to about 18 feet.

7. The testing device of claim 2 wherein the bracket has a forwardly extending angled portion, the magnet disposed at an end of the angled portion.

8. A method for testing an emergency lighting unit comprising the steps of:

providing a testing device having a telescopic handle, test switch activating magnet disposed on a first end of the handle, a temperature sensor disposed adjacent to the magnet and means for displaying the temperature in the area adjacent to the magnet;

extending the handle to a length sufficient to reach the lighting unit, placing the magnet on the unit adjacent to a test switch, the magnet engaging and actuating the test switch; and maintaining the switch in an actuated position for a period sufficient to assure that the lighting unit is operable.

9. The method of claim 8 further comprising the step of determining the ambient temperature adjacent to the lighting unit.

* * * * *